W. E. PUGH.
TIRE.
APPLICATION FILED OCT. 18, 1915.
1,227,000.
Patented May 22, 1917.
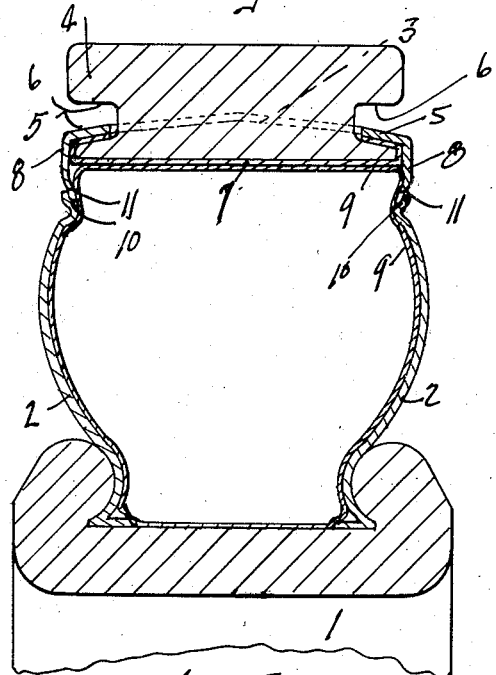
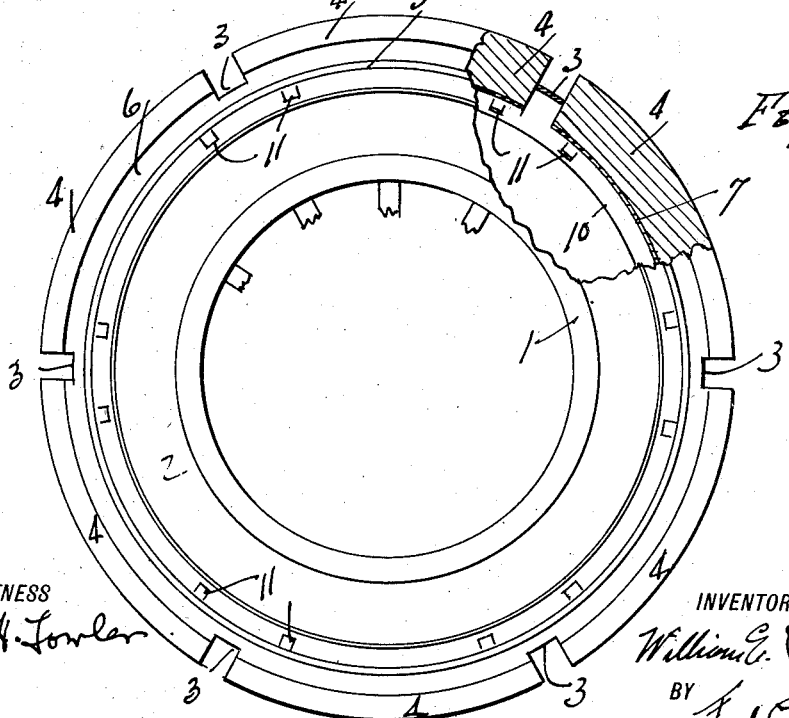
WITNESS
Frank H. Fowler
INVENTOR
William E. Pugh
BY
Fred C. Gorin
ATTORNEY

UNITED STATES PATENT OFFICE.

WILLIAM E. PUGH, OF SEATTLE, WASHINGTON.

TIRE.

1,227,000.

Specification of Letters Patent.  Patented May 22, 1917.

Application filed October 18, 1915. Serial No. 56,363.

*To all whom it may concern:*

Be it known that I, WILLIAM E. PUGH, a citizen of the United States, and a resident of Seattle, in the county of King and State of Washington, have invented new and useful Improvements in Tires, of which the following is a full, true, and exact specification.

My invention relates to improvements in tires and has for its principal object, to provide a pneumatic tire which when punctured or deflated, may still be used as a tire without injury to the tread, casing or inner tube of the tire. Another object is to provide a novel form of construction for accomplishing the above mentioned results.

Other objects will appear as my invention is more fully explained in the following specification, illustrated in the accompanying drawings and pointed out in the appended claim.

In the drawings, Figure 1 is an enlarged sectional elevation of a tire with parts broken away and the inner tube omitted. Fig. 2 is a side elevation of my device with parts broken away.

Referring more particularly to the drawings, numeral 1 indicates a rim of any approved form which supports an outer casing 2 which is preferably of spring metal. The casing 2 is open on the face except for cross ties 3 between treads 4. Casing 2 has continuous flanged rims 5 around it which serve to hold the treads 4 in place as well as stiffen the casing. The treads 4 are channeled as at 6 to receive the rims 5 and to leave a wide outer face on the tread. Treads 4 are secured to plates 7 which fit slidably between parallel sides 8 of casing 2. An inner tube 9 bears against the inside of casing 2 and the under side of plate 7 and when inflated, holds the plate 7 into place as shown, at the same time pounding a resilient backing for the treads. When the inner tube is not inflated, the treads 4 and plates 7 are forced into the casing 2 until the plate 7 is stopped by annular ledges 10 on casing 2. Spring catches 11 retain the plates against the ledges 10 and prevent rattling of the plates and treads. It will be seen that when in a deflated condition, a good substantial solid tire is formed which will take the place of an inflated tire and obviate the necessity of much expensive repairs while on the road.

While I have shown a particular form of embodiment of my invention, I am aware that many minor changes therein, will readily suggest themselves to others skilled in the art without departing from the spirit and scope of the invention, and I therefore desire to avoid being limited to the exact form shown and described except as pointed out in the appended claim. Having described my invention, what I claim as new and desire to protect by Letters Patent, is—

In a device of the class described, the combination of a metallic outer casing having tread block openings in its face and inwardly extending rims, radially channeled tread blocks mounted on metallic plates, said plates being normally retained by said rims, annular internal shoulders on said rims and spring catches in said rims, whereby when the said plates are depressed radially beyond a predetermined point they engage said shoulders and are retained by said catches.

WILLIAM E. PUGH.